(12) United States Patent
Carrera

(10) Patent No.: US 7,210,658 B2
(45) Date of Patent: *May 1, 2007

(54) GATED RETAINER

(76) Inventor: Jose Francisco Carrera, 732 W. Palms, Las Cruces, NM (US) 88007

( * ) Notice: Subject to any disclaimer, the term of this patent is extended or adjusted under 35 U.S.C. 154(b) by 0 days.

This patent is subject to a terminal disclaimer.

(21) Appl. No.: 11/247,678

(22) Filed: Oct. 11, 2005

(65) Prior Publication Data

US 2006/0027712 A1  Feb. 9, 2006

Related U.S. Application Data

(63) Continuation of application No. 10/355,815, filed on Jan. 30, 2003, now Pat. No. 6,953,175.

(51) Int. Cl.
*F16L 3/08* (2006.01)
*F16L 3/12* (2006.01)

(52) U.S. Cl. .................. 248/74.1; 248/58; 248/65

(58) Field of Classification Search ........... 248/74.1, 248/58, 65, 74.2, 71, 316.5; 24/487, 512, 24/513, 30.5; 269/131

See application file for complete search history.

(56) References Cited

U.S. PATENT DOCUMENTS

| | | | |
|---|---|---|---|
| 749,760 A | 1/1904 | Townsend | |
| 1,732,627 A | 10/1929 | Wilson | |
| 3,258,039 A * | 6/1966 | Ewalt | ............ 140/71 R |
| 3,601,863 A | 8/1971 | Dorsey | |
| 3,627,300 A | 12/1971 | Caveney et al. | |
| 3,717,906 A | 2/1973 | Wells | |
| 3,875,618 A | 4/1975 | Schuplin | |
| 3,883,939 A | 5/1975 | Fortsch | |
| 3,887,965 A | 6/1975 | Schuplin | |
| RE29,037 E | 11/1976 | Caveney et al. | |
| 4,029,277 A | 6/1977 | Bulanda | |
| 4,337,934 A * | 7/1982 | Caveney | ............ 269/77 |
| 4,424,627 A | 1/1984 | Tarbox | |
| 4,436,266 A | 3/1984 | Gerding | |
| 4,511,107 A | 4/1985 | Funk | |
| 4,669,688 A | 6/1987 | Itoh et al. | |
| 4,877,228 A | 10/1989 | Ripert | |
| 5,168,842 A | 12/1992 | Brooks | |
| 6,003,852 A | 12/1999 | Kawamura | |
| 6,068,048 A | 5/2000 | Cude | |
| 6,561,734 B1 * | 5/2003 | Allen et al. | ............ 405/216 |

* cited by examiner

*Primary Examiner*—Amy J. Sterling
(74) *Attorney, Agent, or Firm*—Donn K. Harms

(57) ABSTRACT

A quick acting gated retainer for wire, cable, or other elongated material requiring a permanent or temporary mount. The device features one or a pair of spring biased gates on one or both sides rotating and concurrently translating inwardly, during both the insertion and removal process of cable from the guide cavity formed to hold the inserted cable. This provides a clear line for both insertion and removal of cable or similar elongated objects from the guide cavity and prevention of damage to the inserted object from the gates which will naturally retract from contact with the inserted wire since the gates translate as well as rotate in their engagement. The nylon structure with the internal reinforcing guarantees a long lasting, rigid device that will not damage wires, cables or ropes held within the guide cavity.

12 Claims, 2 Drawing Sheets

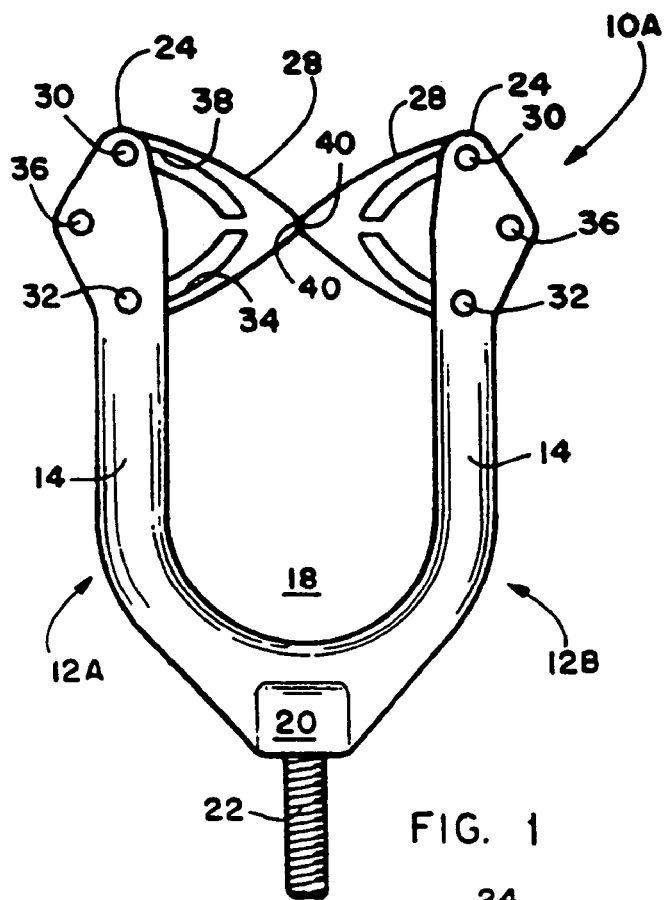
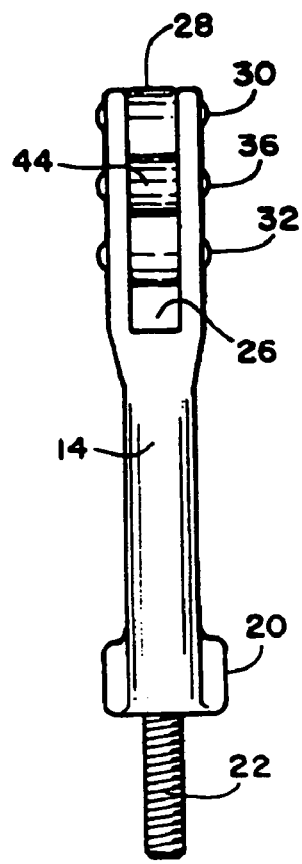
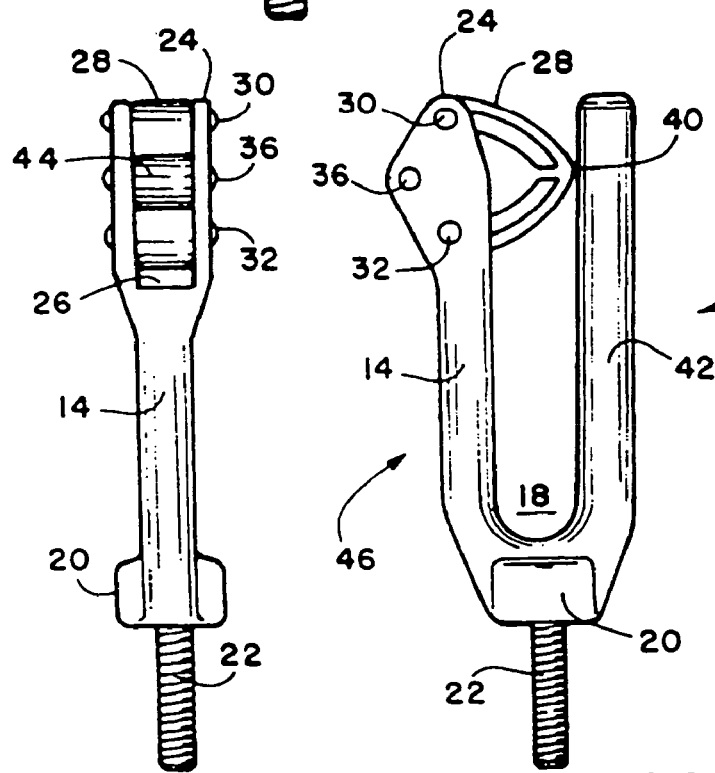
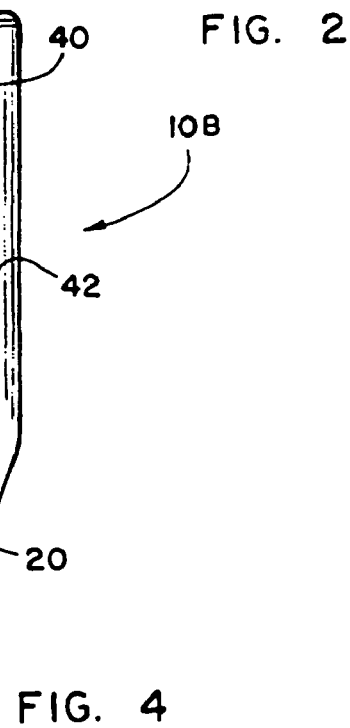
FIG. 1
FIG. 2
FIG. 3
FIG. 4

GATED RETAINER

This application is a Continuation Application from U.S. patent application Ser. No. 10/355,815 filed on Jan. 30, 2003 now U.S. Pat. No. 6,953,175.

FIELD OF THE INVENTION

The disclosed device relates to retainers. More particularly this invention relates to the field of retainers constructed to be used in a variety of applications, primarily holding an accumulation of wires, cables within a confined cavity, either permanently or temporarily, during formation of a wiring harness. The device can also be used for temporary or permanent mounting of wires, hoses, cables, or other elongated devices in need of a formed path or paths for mounting.

A wide variety of quick acting retainers are used on boats to hold ropes and cables in place. Many styles of retainers have been used in the electronics field to hold the wiring in place, the most common recent innovation being the plastic Zip-ties. Other styles of common wire retainers hold the spark plug wires in place in the automobile engine. Still other retainers are used for holding wires in place temporarily during the manufacturing processes in fabricating wiring harnesses for automobiles, appliances and aircraft. A requirement of many of these retainers is that they not only are quick acting for the insertion process but that they are equally quick acting for the removal process. Further, as such wires generally carry electrical current, it is highly desirable to prevent stress or damage to the wires themselves or the formed wiring harness while concurrently retaining the wire cluster within a cavity for subsequent wrapping with some form of permanent retainer forming the finished wire harness.

The disclosed invention herein provides a unique device where the wire or group of wires, a cable or a rope or group of ropes, may be inserted into a guide cavity by pressing through spring loaded single or double gates. Removal is accomplished using a reverse motion, and because of the movement of the components restraining the wires in the cavity, damage to the formed harness is prevented during insertion into, and removal from, the cavity.

BACKGROUND OF THE INVENTION

This disclosure describes a new and unique wire quick action gated retainer for holding a plurality of electrical or cables during the assembly process of manufacturing wire cable harnesses. It can also be used to hold cables or ropes for inside the cavities of the components for temporary mounting. In the harness industry, it is common practice in the fabrication of a wire harness, to mount a plurality of wire holding components on a panel board along the intended route of the harness. The wires are then placed in the holders as they are run individually between their desired termination points. After completion of the process of forming the proper length and different leads extending from the formed wiring harness, cable ties, shrink wrap, or similar means to retain the formed wire harness in their bundled configuration are used. Such wiring harnesses are frequently used in cars and trucks, as well as in electronic components and other devices in need of elongated wiring harnesses to electrically communicate between electrical components.

Commercially available wire retainers which function to form the wires into a circular grouping typically include a base adapted for secure attachment to the panel board by means of screws or the like, a pair of arms pivotally mounted on the base, and a length of elastomeric material spanning the free ends of the arms and cooperating therewith to form the wires into a generally circular grouping. The weakest component of these retainers is the elastomeric material which can inadvertently become damaged through contact with a sharp object or it loses its resiliency with repeated use, thus requiring replacement.

A common problem of currently commercially available devices is that the elastomeric material cannot be readily replaced causing the entire harness to be scrapped or in need of repair. More specifically, the material is either inaccessible for removal or it is formed into a loop and held by a part of the base thus requiring the time consuming step of removal of the base from the panel board before the looped material can be removed and replaced. It is often easier to replace the entire device than try to replace the elastomeric material.

In other types of wire retainers, the ends of the elastomeric material are pinned or riveted to the base with the pin or rivet head disposed very close to the base thus making the replacement of the material difficult. A further disadvantage of such structures is that the ends of the material are at least partially exposed thereby making them susceptible to accidental separation from their anchoring means.

Other types of wire retainers have a unitary molded arm-base. A problem with such a molded structure is that if the resilient spring arms are molded thin enough to permit low force insertion of a wire, they have insufficient strength to overcome the resiliency of the elastomeric material which has a propensity to eject the wire inserted out between the spring arms.

These types of devices are commonly used in the automotive, appliance and aircraft industry to construct wire harnesses, but through the research and development of this new and unique device, it has become evident that this invention has a multitude of other applications and uses which are provided through the provision of an innovative-gate operation. One and probably the most obvious application of the disclosed gated retainer is in the boating and recreational vehicle industry. Other areas of application will be in the construction industry by retaining extension cords and ropes, and in the toy and game industry where this device offers a safe insertion and removal of an object.

U.S. Pat. No. 3,627,300 of Jack E. Caveney describes a holder for forming a plurality of strands of wire into a bundle for assembling a cable harness. The holder includes a frame having relatively movable arms of which the ends are in spaced relationship. An elastic band is fastened on the frame to yieldably hold the ends spaced and provide a cradle for the wires. With these styles of retainers the elastic bands require periodic replacement and the device does not function adequately for any other purposes.

U.S. Pat. No. 3,601,863 of Milton Dorsey teaches of a cable binder having an elongated, flexible band formed with a plurality of apertures arranged in a row along the longitudinal axis of the band. A rigid coupling means is adapted to be insertably disposed through selected ones of the apertures to retain the band about a single cable or a cable bundle. Other selected apertures may be employed to secure the banded cable or bundle to supporting structure. This invention describes a flexible band that wraps around a banded cable or bundle similar to the Zip-ties used for the same purposes.

U.S. Pat. No. 3,717,906 of Peter M. Wells discloses a cable tie including a flat ratchet toothed strap and a hollow frame having pawls to engage the ratchet teeth of the strap.

The pawls extend from opposite walls of the frame at the entrance thereto and converge in the direction of the outlet. The pawls terminate short of the outlet of the frame in free end surfaces which are generally flat and which are back tapered. The ratchet teeth on the strap are also back tapered and are bordered by flanges. This device is typical to the Zip-ties but shows in one embodiment a hole for receiving a fastener for securing to a wall or the like but would not have the capability of being used for the manufacturing of wire cable harnesses where the harnesses require quick and easy insertion and removal.

U.S. Pat. No. 3,875,618 of Jerome T. Schuplin additionally describes a bundling tie for use in looping about a plurality or bundle of elements, such as wires, tubes or cables, and to be drawn taunt about the bundle for mounting of the elements in bundle form on a support, such as for instance on a circuit board or harness board assembly, and comprising a buckle head having an aperture therethrough and a separate insert pawl mounted in the aperture of the head in generally floatable condition, adapted for locking coaction with a strap portion that is disposed in looped condition and passes into said aperture in the head. Such an arrangement not only facilitates the insertion of the strap into the aperture in the head but also ensures that the locking co-action between the pawl and the strap is such that pull out of the strap from the head is prevented. This device is another invention similar to the Zip-tie and does not have the capabilities of being used in the manufacturing processes of wire cable harnesses.

U.S. Pat. No. 4,029,277 of John J. Bulanda tells of an apparatus for forming a plurality of elongate objects such as wires into a bundle of circular cross section. The apparatus comprises a base to be affixed to a mount such as a panel board and a frame for mounting on the base. The frame comprises a pair of arms extending upwardly from adjacent the base with each arm terminating in an end portion. The end portions are movable relative to one another between a retaining position, wherein the spacing between the end portions is less than the diameter of one of the objects and a release position wherein the spacing is at least as great as the object diameter. In their release portion the end portions define an object-receiving opening. The arms are biased toward their retaining position. The apparatus further comprises a length of elastomeric material removably carried by the frame and free of the base. The length includes a portion bridging the arms adjacent the free ends. This portion cooperates with the end portions to hold the bundle therebetween. The frame and the base comprise attachment means for releasably mounting the frame on the base and operable to remove the frame therefrom whereby upon damage to the length of elastomeric material, it can be removed from the base without removal of the base from the support.

Although this apparatus has been designed to hold wire cable harnesses, it uses the perishable elastomeric method of producing the biasing tension for holding the wire cable harness and this device has no other foreseeable uses other than those specified.

U.S. Pat. No. 4,424,627 of John W. Tarbox describes a means and method that is provided for conveniently breaking out wires from a wire bundle in a wiring harness during the fabrication or layout stage, there being a wrapper having two parallel rows of holes punched therein and a specially designed comb having teeth with detent ends which are inserted through the first row of holes in the wrapper. The wire bundle is then passed alongside these teeth with the desired strands being broken out between the teeth, and subsequent to the breakout process the wrapper is folded over the wire bundle and the second row of holes engaged securely over the detent ends of the comb teeth. This device has been designed for a specific purpose and would not be usable in the manufacturing process of wire harnesses.

U.S. Pat. No. 4,669,688 of Kenkichi Itoh discloses a cable clamp with a base having a fixing portion on the lower surface, a flat clamp rockingly connected to the base, and a means for locking a distal end of the flat clamp to the base engageably or disengageably. The cable clamp retains electric wires between the base and the flat clamp. The locking member comprises a plate-shaped protrusion provided on the flat clamp or the base and a retaining protrusion formed with the outer surface thereof. A resilient retaining member is protrudingly provided on the flat clamp opposite the plate-shaped protrusion or the base and has a hole for engaging with the retaining protrusion. An engaging member is protrudingly provided on the same surface with the resilient retaining member in parallel and engaging with an inner surface of the plate shaped protrusion. Further, a notched portion formed with a distal end of the resilient retaining member faces the engaging member. Therefore, the cable clamp can easily carry out unlocking without any unlock levers and offers not only a simple but also a secure locking mechanism. This device often used in the automotive industry will not work effectively as a quick acting retainer to be used in manufacturing wiring harnesses due to the fact that the hinge mechanism is not adaptable to prolonged usage and the device is somewhat limited to other applications where it may be used.

U.S. Pat. No. 5,168,842 of Steve Brooks tells of a spark plug wire harness which includes a plurality of brackets having base portions which are secured to the valve cover of conventional internal combustion engines utilizing existing bolts and which have longitudinally and vertically aligned openings through which the spark plug wires are retained to thereby both space the wires from the engine and each other and to organize and align the wires between the distributor and the spark plugs. In some embodiments the brackets include adjustable sections. This device has been designed specifically to hold a spark plug wiring harness in a fixed location and would not be adaptable to the manufacturing processes of assembling wiring harnesses.

U.S. Pat. No. 6,068,048 of James Russell Cude a wire retainer for use in an air conditioning outdoor cabinet which houses a fan and a spine fin heat exchanger coil includes an extension portion, a base portion and a clip portion. The extension portion of the wire retainer is anchor-like and includes fluke-like members that, when inserted into and through spine fin material, lodge securely therein. The base portion of the retainer abuts the spine fin of the heat exchanger coil and positions the clip portion as such that wires or a wire bundle running interior of the coil can be guided and secured appropriately so as not to be cut by the fan or buffeted and broken by the relatively high velocity, high volume stream of air that is drawn by the fan through the interior of the air conditioning cabinet and the heat exchanger coil housed therein. This is another limit usage device that would not adaptable to be used in the manufacturing of wiring harnesses.

Thus there is a continuing need for improved devices to retain wire, cable or rope during formation of wiring harnesses or to provide a path for mounting. Such a device should have quick acting gates for easy insertion or removal with an extremely wide range of applications. Such a device should provide such quick action gates which allow for easy insertion and removal of wires and cable from the formed cavity and also prevent damage to the wiring harness or wires from abrasion by the gates with the wires or harness in the cavity.

SUMMARY OF THE INVENTION

A preferred embodiment of this invention consists of a quick acting gated retainer that is usable in a wide variety of applications with wire, cable, rope, hose, or other elongated material needing a formed path for assembly or permanent or temporary mounting. This preferred embodiment of the disclosed device incorporates two support members with opposing quick acting gate units on the preferred embodiment and an alternate embodiment with a single support member with a quick acting gate unit abutting a support rod. The two support member arm units join together at the base forming the radial guide cavity between the support member arm units and the quick acting gate or gates. While the depicted base has only a single threaded attachment means for mounting to a surface, other conventional attachment means would easily be incorporated on this device and those also must be included within the scope of this patent. Each distal end of the support members incorporate a yoke retaining a quick acting gate unit. The quick acting gate unit operates on a floating axis or coaxial system where it rotates in and downwardly on a primary axis pin while the secondary axis pin translates within primary axis slot. The spring biasing means then pivots on a bias spring pivot pin. When the quick acting gate rotates in and upwardly on a secondary axis pin, the primary axis pin translates within the secondary axis slot with a spring biasing means pivoting on a bias spring pivot pin. When used to assemble wire, the embodiment of the gated retainer with double gates may have gate member tip ends which may be in direct contact. However, in some cases it may be desirable to have the tips overlapping to aide in restraining wires. The meeting or overlapping of the gate member tip ends or the meeting of a single quick acting gate member where the gate member tip end abuts a support rod, perform a similar restraining task as the double gated device with the same mechanisms and must be considered within the scope of this patent.

Consequently, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent construction insofar as they do not depart from the spirit and scope of the present invention.

An object of this quick acting gated retainer is to create a means to hold wires in place during the fabrication process of making wiring harnesses.

Another object of this invention is to create a means to operate a retainer for holding wiring harnesses during the fabrication process without using an elastomeric retaining system.

An additional object of this invention is to create a nylon wire, cable or rope quick acting gated retainer that will not damage the material or the wires being retained, but will be strong enough to support a large load without breaking.

Yet another object of this invention is to create a long lasting wire, cable or rope quick acting gated retainer that will function in severe environments over a long period of time.

A further object of this invention is to create a device whereby the gates translate and rotate inwardly, out of the way during insertion or removal processes.

Still another object of this device is to create a wire, cable or rope quick acting gated retainer that will not damage the article held.

A final object of this invention is to create an improved wire, cable or rope quick acting gated retainer that is usable in a much wider variety of applications than the present prior art.

These together with other objects and advantages which become subsequently apparent reside in the details of the construction and operation as more fully hereinafter described and claimed, reference being had to the accompanying drawings forming a part thereof, wherein like numerals refer to like parts throughout.

BRIEF DESCRIPTION OF THE DRAWINGS

The accompanying drawings, which are incorporated in and form a part of this specification, illustrate embodiments of the invention and together with the description, serve to explain the principles of this invention.

FIG. 1 depicts a the quick acting gated retainer with two opposing gate mechanisms.

FIG. 2 depicts a side view of the quick acting gated retainer with two gate mechanisms.

FIG. 3 depicts a side view of the alternate embodiment of the quick acting gated retainer with a single gate mechanism.

FIG. 4 depicts a front view of the alternate embodiment of the quick acting gated retainer with a single gate mechanism.

DETAILED DESCRIPTION OF THE PREFERRED EMBODIMENTS

Figures 5, 6, 7:
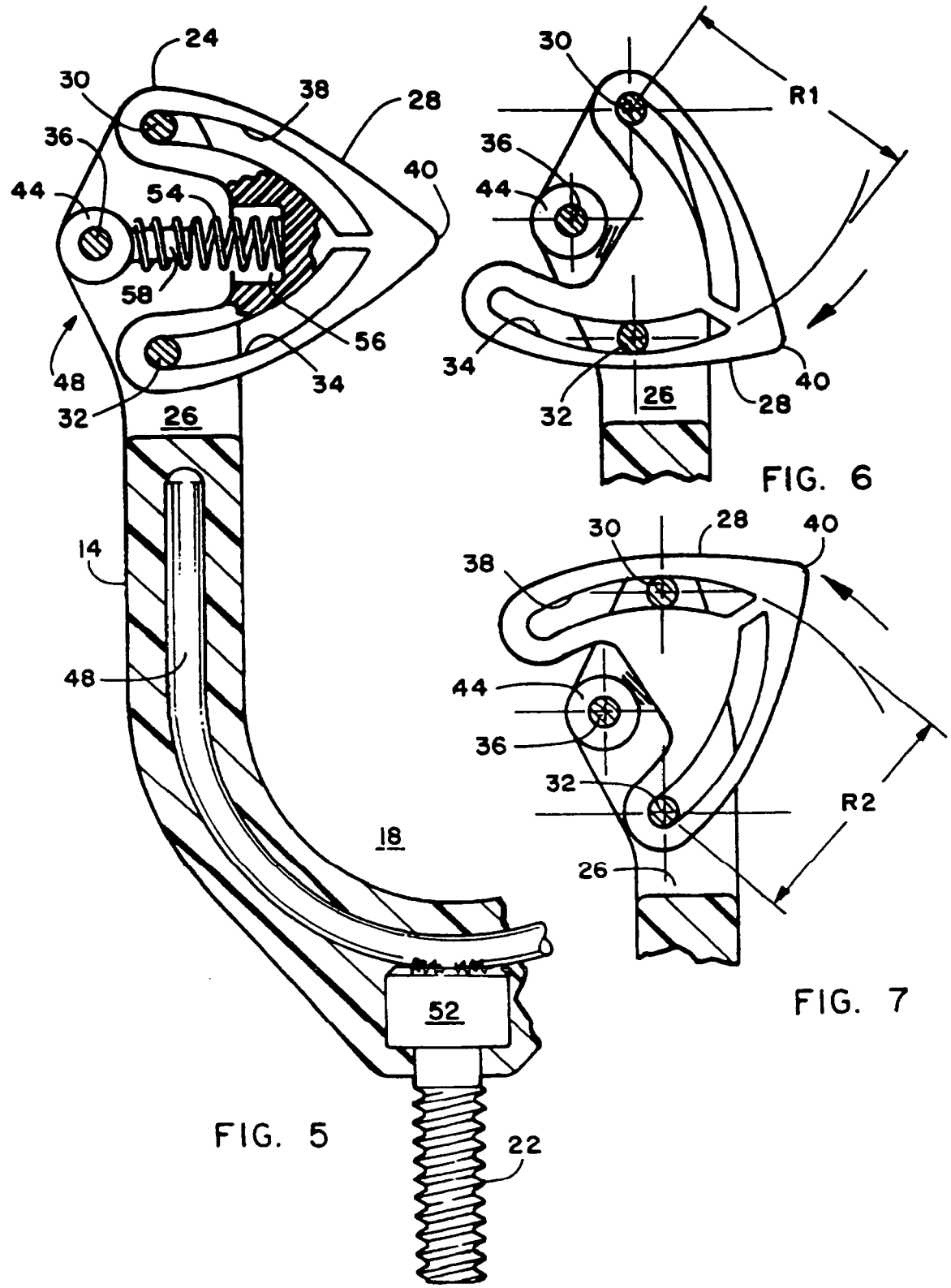
FIG. 5 depicts a section through one side of the quick acting gated retainer depicting in detail the spring mechanism of the gate portion and the location and attachment means of the reinforcing member.
FIG. 6 depicts the geometry of the retracting action of the quick acting gate mechanism in the insertion position.
FIG. 7 depicts the geometry of the retracting action of the quick acting gate mechanism in the removal position.

Referring now to the drawings, wherein similar parts of the invention are identified by like reference numerals, there is seen in FIG. 1 the quick acting gated retainer for wire, rope, cable, or other elongated material, with double gates 10A having two support members, a left support member 12A and a right support member 12B. Each of the support members 12A and 12B consist of a support member arm unit 14 that joins together at the base 20 forming the radial guide cavity 18. The base 20 is shown with, but not limited to a single threaded means of attachment 22 however those skilled in the art will realized that other means of attachment can be easily be incorporated on this device and must be included within the scope of this patent. However the current preferred mode of the device a threaded means of attachment 22 is used.

Each distal end 24 of the support members 12A and 12B incorporates a yoke 26 retaining a quick acting gate unit 28. In the current best mode of the disclosed device, the gate unit 28 is generally triangular in shape. The quick acting gate unit 28 operates on a floating axis or coaxial system where it rotates downwardly and translates toward the pivot pin 36 on a primary axis pin 30 during insertion of wires into the guide cavity 18 while concurrently the secondary axis pin 32 translates within primary axis slot 34. A biasing means, which in this case is a spring 54 biases the gate 28 away from the pivot pin 36 during such rotation causing the axis pin 30 to remain at a first end of the secondary axis slot 38 during this rotation. This biasing means also provides a means for lateral translation of the gate member tip ends 40 toward the pivot pin 36 concurrently with the rotation of the quick acting gate 28 in either the upward or downward direction.

When the quick acting gate 28 rotates in and upwardly toward the retraction position, the secondary axis pin 32 is engaged at a first end of the primary axis slot 34 and concurrently the primary axis pin 30 translates within the secondary axis slot 38 with the spring biasing means pivoting on a bias spring pivot pin 36 holding the secondary axis pin 32 in position. All of the quick acting gates 28 operate in substantially the same fashion be it on embodiments with one or two of the quick acting gates 28 and all provide for both rotation and of the gates and concurrent lateral translation of the gate member tip ends 40 toward and away from the pivot pin 36 during such rotation as can be seen in the FIGS. 5–7.

On the embodiment of the quick acting gated retainer with double gates 10A, the gate member tip ends 40 are shown in direct contact, but in some cases it may be desirable to have the tips over lapping to aide in restraining wires. The meeting or overlapping of the gate member tip ends 40 or the meeting of a single quick acting gate member 28 where the gate member tip end 40 abuts a support rod 42 of the alternate embodiment depicted in FIGS. 3 and 4, perform the same restraining task and must be considered within the scope of this patent. The embodiment with two quick acting gates 28 provides for a larger guide cavity 18.

FIG. 3 depicts a side view of the alternate embodiment of the wire, cable or rope quick acting gated retainer with a single gate mechanism 10B indicating the position of the yoke 26 retaining the quick acting gate unit 28 and the biasing spring pivot member 44 on the distal end 24 of the single support member arm unit 46. FIG. 4 depicts a front view of the alternate embodiment of the wire, cable or rope quick acting gated retainer 10B with a single quick acting gate unit 28 on the distal end 24 of the single support member 46 and the opposing support bar 42. The support member arm unit 14 and the support rod 42 join at the base 20 to form the radial guide cavity 18. The base 20 is shown with, but not limited to, a threaded attachment means 22.

FIG. 5 depicts a section through one side of the preferred embodiment of the disclosed quick acting gated retainer with double gates 10A clarifying the biasing spring mechanism 48 of the quick acting gate unit 28 and the reinforcing member 50 attached to the head end 52 of the threaded attachment means 22. The biasing spring mechanism 48 operates by having the biasing spring 54 captive between the spring cavity 56 within the quick acting gate unit 28 and the spring nib 58 on the biasing spring pivot member 44 that pivots on the spring pivot pin 36. This biasing spring mechanism 48 also allows for a slight lateral translation of the gate unit 28 and toward the pivot member 44 thus allowing the gate member tip end 40 to translate toward the pivot member 44 during rotation of the gate unit 28 to the insertion position shown in FIG. 6 or the retraction position shown in FIG. 7. This slight lateral translation can occur concurrently during rotation of the gate unit 28 in either direction and is especially important in preventing damage to a cables which are being held in the guide cavity 18 during assembly of a wire harness since the gate unit 28 will translate away form the wires forming the harness instead of damaging them.

FIG. 6 depicts the geometry of the retracting action of the quick acting gate unit 28 in the insertion position where the quick acting gate unit 28 operates on a floating axis or coaxial system where it rotates downwardly on a primary axis pin 30 while the secondary axis pin 32 translates within primary axis slot 34 along the radius R1 with a spring biasing means pivoting on a bias spring pivot pin 36.

FIG. 7 depicts the geometry of the retracting action of the quick acting gate unit 28 in the retraction position where the quick acting gate unit 28 operates on a floating axis or coaxial system where it rotates upwardly on a secondary axis pin 32 while the primary axis pin 30 translates within secondary axis slot 38 along the radius R2 with a spring biasing means pivoting on a bias spring pivot pin 36.

The quick acting gated retainers herein shown in the drawings and described in detail herein disclose arrangements of elements of particular construction and configuration for illustrating preferred embodiments of structure and method of operation and manufacture of the present invention. It is to be understood, however, that elements of different construction and configuration and other arrangements thereof, other than those illustrated and described, may be employed for providing quick acting gated retainers in accordance with the spirit of this invention, and such changes, alternations and modifications as would occur to those skilled in the art are considered to be within the scope of this invention as broadly defined in the appended claims. As such, while the present invention has been described herein with reference to particular embodiments thereof, a latitude of modifications, various changes and substitutions are intended in the foregoing disclosure, without departing from the scope of the invention as set forth in the following claims.

What is claimed is:

1. A gated retainer comprising:

a first support member extending to a distal end from a base;

a second support member extending to a distal end from said base;

means of attachment of said base to a surface;

a first gate, said first gate having a first end and a tip end opposite said first end and having a top side edge and a bottom side edge;

a first means for rotation of said first gate on said distal end of said first support member, said first means for rotation having a primary axis pin attached to said distal end of said first support, said primary axis pin engaged in a first curved slot running adjacent to said top edge of said first gate;

a second means for rotation of said first gate on said distal end of said first support member said second means for rotation having a secondary axis pin attached to said distal end of said first support, said secondary axis pin engaged in a second curved slot running adjacent to said bottom edge of said first gate;

a guide cavity defined by the area between said first support member, said second support member, said base, and said bottom side edge of said first gate;

means to bias said first gate to a default position placing said tip end adjacent to said distal end of said second member;

said first gate rotatable toward said guide cavity to an insertion position with said tip end immediately adjacent to said first support member;

said first gate rotatable away from said guide cavity to a retraction position with said tip end immediately adjacent to said distal end of said first support member; and whereby said first gate, when in said default position, will rotate to said insertion position when force is exerted on said top side edge, and said first gate will rotate to said retraction position when force is exerted on said bottom side edge, and said first gate will return to said default position when force on either of said side edges ceases.

2. The gated retainer of claim 1 further comprising:
said primary axis pin is biased to one end of said first slot thereby providing a top pivot for said first gate and said secondary axis pin laterally translates in said second slot thereby providing lateral translation of said tip end to said position adjacent to said first support member, when force is applied to said top side edge of said first gate.

3. The gated retainer of claim 1 further comprising:
said secondary axis pin biased to one end of said second slot thereby providing a bottom pivot for said first gate and said first axis pin laterally translates in said first slot thereby providing lateral translation of said tip end to said position adjacent to said distal end of said first support member, when force is applied to said bottom side edge of said first gate.

4. The gated retainer of claim 1 further comprising:
said secondary axis pin biased to one end of said second slot thereby providing a bottom pivot for said first gate and said first axis pin laterally translates in said first slot thereby providing lateral translation of said tip end to said position adjacent to said distal end of said first support member, when force is applied to said bottom side edge of said first gate, and
said primary axis pin is biased to one end of said first slot thereby providing a top pivot for said first gate and said secondary axis pin laterally translates in said second slot thereby providing lateral translation of said tip end to said position adjacent to said first support member, when force is applied to said top side edge of said first gate.

5. The gated retainer of claim 1 further comprising said first gate being generally triangular in shape.

6. The gated retainer of claim 2 further comprising said first gate being generally triangular in shape.

7. The gated retainer of claim 3 further comprising said first gate being generally triangular in shape.

8. The gated retainer of claim 4 further comprising said first gate being generally triangular in shape.

9. The gated retainer of claim 1 further comprising:
a plurality of said gated retainers used as a kit;
each said guide cavity of each said gated retainer being sized to accommodate a plurality of wires inserted therein; and
said plurality of gated retainers attached to said surface in a pattern to form a wire harness pattern from said wires inserted into said respective guide cavity of each of said plurality of said gated retainers.

10. A gated retainer comprising:
a first support member extending to a distal end from a base;
a second support member extending to a distal end from said base;
means of attachment of said base to a surface;
a first gate, said first gate having a first end and a tip end opposite said first end and having a top side edge and a bottom side edge;
a guide cavity defined by the area between said distal end of said first support member, said distal end of said second support member and said base;
a first means for rotational engagement of said first gate to said distal end of said first support member, said first means for rotational engagement providing for rotation of said first gate toward said guide cavity;
a first means to translate said tip end to an insertion position adjacent to said first support member during rotation of said gate toward said guide cavity;
a second means for rotational engagement of said first gate to said distal end of said first support member, said second means for rotational engagement providing for rotation of said first gate away said guide cavity;
a second means to translate said tip end to an insertion position adjacent to said first support member during rotation of said gate away from said guide cavity;
means to bias said tip end to a default position adjacent to said second support member; and
whereby said first gate, when in said default position, will rotate to said insertion position when force is exerted on said top side edge, and said first gate will rotate to said retraction position when force is exerted on said bottom side edge, and said first gate will return to said default position when force on either of said side edges ceases.

11. The gated retainer of claim 10 further comprising:
a plurality of said gated retainers used as a kit;
each said guide cavity of each said gated retainer being sized to accommodate a plurality of wires inserted therein; and
said plurality of gated retainers attached to said surface in a pattern to form a wire harness pattern from said wires inserted into said respective guide cavity of each of said plurality of said gated retainers.

12. A gated retainer comprising:
a first support member extending to a distal end from a base;
a second support member extending to a distal end from said base;
means of attachment of said base to a surface;
a first gate, said first gate having a first end and a tip end opposite said first end and having a top side edge and a bottom side edge;
a first means for rotation of said first gate on said distal end of said first support member, said first means for rotation having a primary axis pin attached to said distal end of said first support, said primary axis pin engaged in a first curved slot running adjacent to said top edge of said first gate;
a second means for rotation of said first gate on said distal end of said first support member said second means for rotation having a secondary axis pin attached to said distal end of said first support, said secondary axis pin engaged in a second curved slot running adjacent to said bottom edge of said first gate;
a guide cavity defined by the area between said first support member, said second support member and said base;
means to bias said first gate to a default position placing said tip in a central area of said guide cavity between said first and second support member;
a second gate, said second gate having a first end and a tip end opposite said first end and having a top side edge and a bottom side edge;
a first means for rotation of said second gate on said distal end of said second support member, said first means for rotation having a primary axis pin attached to said distal end of said second support member, said primary axis pin engaged in a first curved slot running adjacent to said top edge of said second gate a second means for rotation of said second gate on said distal end of said second support member said second means for rotation having a secondary axis pin attached to said distal end of said second support member, said secondary axis pin engaged in a second curved slot running adjacent to said bottom edge of said second gate;

means to bias said second gate to a default position placing said tip of said second gate adjacent to said tip of said first gate;

said first gate rotatable toward said base to a respective insertion position with said tip end of said first gate adjacent to said first support member;

said second gate rotatable toward said base to a respective insertion position with said tip end of said second gate adjacent to said second support member;

said first gate rotatable away from said base to a retraction position with said tip end of said first gate adjacent to said distal end of said first support member;

said second gate rotatable away from said base to a retraction position with said tip end of said second gate adjacent to said distal end of said second support member;

whereby said first gate or said second gate, when in said default position, will rotate toward said insertion position when force is exerted on a respective said top side edge, and said first gate or said second gate will rotate to a respective said retraction position when force is exerted on a respective said bottom side edge, and said first gate and said second gate will return to said default position when force on either of a respective of said side edges ceases.

* * * * *